UNITED STATES PATENT OFFICE.

MARIUS OTTO AND ALBERT VERLEY, OF COURBEVOIE, FRANCE.

PROCESS OF OBTAINING VANILLIN, &c.

SPECIFICATION forming part of Letters Patent No. 553,039, dated January 14, 1896.

Application filed May 22, 1895. Serial No. 550,253. (No specimens.)

*To all whom it may concern:*

Be it known that we, MARIUS OTTO and ALBERT VERLEY, chemists, citizens of the French Republic, residing at 7 Quai de Seine, Courbevoie, near Paris, France, have invented new and useful Improvements in the Manufacture of Perfumes, of which the following is a complete and clear specification.

We have discovered that ozone acts in an exceedingly advantageous manner upon certain carbon compounds, and in particular on the carbon compounds which have a benzene nucleus with a lateral chain $C_3H_5$ so as to give aldehydes. The carbon compounds to which we refer have this lateral chain in the form $CH=CH-CH_3$, or its isomer $CH_2-CH=CH_2$. We have applied this reaction to the industrial preparation of substances capable of being employed in perfumery, such as vanillin, heliotropin, and aubepin.

Taking first those bodies in which the chain $C_3H_5$ exists as $CH=CH-CH_3$—such as isoeugenol, isosafrol, and anethol—the reaction takes place in the following manner, (taking isoeugenol as an example:)

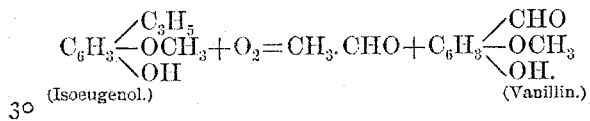

It is well known that in the methods previously used for the preparation of vanillin it has been indispensable to operate first on the phenol group OH—that is to say, to combine it with an alcoholic or acid radical—in order to secure that the oxidization should only affect the group $C_3H_5$; but we have found that the action of ozone upon isoeugenol is so selective that the phenol group remains unaffected and the group $C_3H_5$ only is oxidized. It is therefore not necessary to replace by a preliminary operation the hydrogen of the phenol group by an alcoholic or acid radical in order to obtain vanillin. It is, however, evident that if the hydrogen of the phenol group OH of the isoeugenol is replaced by any radical the transformation of the derivative thus obtained into substituted vanillin can also be effected by means of ozone. For instance, if one treats isoengenate of potassium with ozone, a potassic salt of vanillin is obtained, and by treating this salt with an acid the vanillin is set at liberty.

Similarly the isosafrol

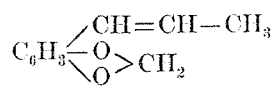

oxidized by ozone gives piperonal or piperonylic aldehyde

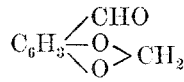

in perfumery called "heliotropin."

The anethol

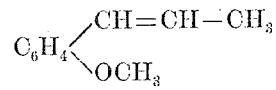

oxidized by ozone gives anisal or anisic aldehyde

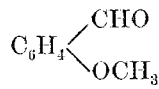

in perfumery called "aubepin."

We prefer to effect these oxidations warm; but it is unnecessary to dissolve the bodies which are to be oxidized in liquids in the manner hitherto used. This advantage, which arises from using a gaseous oxidizer instead of a liquid oxidizer, is of considerable importance. For example, if the oxidation be made in the old manner by sulfuric acid and bichromate of potassium or chromic acid, it has to be performed on masses of liquid which are in general fifty times as large as the body that it is desired to oxidize, and this gives rise to difficulty in extracting the product of the operation from the large quantity of liquid that has been used when the reaction is finished. Ozone, on the other hand, being always diffused among an excess of oxygen which is not ozonized can act without danger of creating any violent reaction on the body without it being mixed with such liquids, so that instead of requiring vessels of fifty times the size one requires them to be only capable of containing the body originally to be operated upon. Therefore in carrying out our invention industrially the carbon compound may be placed in a suitable vessel and a current of ozone gas passed through it until the oxidation is effected, when the resulting aldehyde can be isolated by any of the methods well-known in the art. The process is so simple that any one skilled in the art can readily operate it. Taking next the bodies in which the chain $C_3H_5$ exists in the form $CH_2-CH=CH_2$, such as eugenol, safrol, and estragol, the ozone is applied in the same manner and the action results in the same body—that is to say, vanillin, heliotropin, and aubepin. Thus, for eugenol,

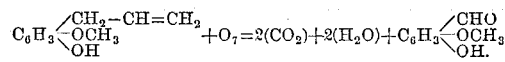

We have not deemed it necessary to describe any mode of producing ozone gas, or of ozone mingled with normal oxygen, as such modes are well-known and the production of the ozone forms no part of our invention.

What we claim is—

The herein described method of oxidizing a carbon compound, as isoeugenol, having a benzene nucleus with a lateral chain $C_3H_5$, in order to produce its corresponding aldehyde, as vanillin, which method consists in first subjecting said carbon compound directly to the oxidizing influence of ozone until the group $C_3H_5$ has been transformed into the group CHO, and then isolating the resulting aldehyde, substantially as set forth.

In witness whereof we have hereunto signed our names in the presence of two subscribing witnesses.

MARIUS OTTO.
ALBERT VERLEY.

Witnesses:
CLYDE SHROPSHIRE,
D. T. S. FULLER.